Patented Sept. 11, 1928.

1,683,702

UNITED STATES PATENT OFFICE.

FRITZ SEEBACH, OF ERKNER, NEAR BERLIN, GERMANY, ASSIGNOR TO BAKELITE GESELLSCHAFT MIT BESCHRANKTER HAFTUNG, OF BERLIN, GERMANY.

PROCESS FOR PURIFYING PHENOL FORMALDEHYDE RESINS.

No Drawing. Application filed February 6, 1926, Serial No. 86,638, and in Germany February 17, 1925.

The present process for purifying phenolformaldehyde resins relates to the removal or the diminution of any free or insufficiently combined phenols. The insufficiently combined phenols produced by the by-reaction of aldehydes on the phenols are soluble in water in the presence of alkalies, have a decided odor, and can be transformed into colored products by the action of light and air, but their chemical constitution is not yet known. The process consists in combining as usual phenol and formaldehyde and then dissolving the ready combined resins with alkalies in a quantity insufficient for forming the alkali metal salts of the condensation products, but sufficient for combining with the free phenols and avoiding the splitting up of phenols from their alkali metal compound in the subsequent precipitation with water, which can be effected after the mixture has been allowed to stand for a little while. The amount of alkali necessary for forming the alkali salts of the phenolformaldehyde condensation resins can be found by ascertaining the amount of the resins and calculating the amount of alkali necessary for neutralizing a phenol group in the compound or by stating experimentally the amount of alkali necessary for dissolving the resin completely. The amount of alkali necessary for neutralizing the free phenol may be ascertained by stating the amount of free phenols extracted from a certain amount of resin by means of water.

The resin can be prepared, in accordance with the process known, as follows: The condensation is effected by means of adding alkalies or alkaline reacting substances or alkalies or alkaline reacting substances and acids successively, thereafter introducing steam or vapours of organic solvents.

The treatment of the phenolformaldehyde resin with alkali is preferably executed in the presence of the organic solvents of the resins, which solvents are preferably added to the resins immediately after their formation. Suitable solvents are ethyl alcohol, methylalcohol, acetone, ether or mixtures of the same, for instance ethylalcohol with methylalcohol, or alcohols with acetone, alcohols with ether, acetone with ether etc.

As precipitating agent for the resins water or water and such substances may be used, which have the property of rendering difficultly soluble or insoluble impurities of the resins soluble in water. Such substances are for instance sodium salicylate, the alkali metal salts of the higher fatty acids, especially soaps. Suitable soaps are the alkali metal soaps (including ammonia soaps) of the liquid or solid fatty acids, natural resin acids, wax acids, the soaps from sulfonated fatty or fatty acids, oxy-fatty acids or halogenated fatty acids. Mixtures of the various soaps can also be used.

On using the above mentioned substances the advantage consists in the precipitation being effected quickly and requiring less water. The colloidal resin solution can be prepared by means of adding the said substances to the resins before or during the addition of alkali, thereby diminishing the quantity of alkali in preparing the colloidal resin solution and accelerating the precipitation.

The precipitation may be carried out by adding the colloidal resin solution to the water or the aqueous solutions or inversely the water or the aqueous solutions to the colloidal resin solution. The present process may be applied to all phenol-aldehyde resins, obtained without condensing agents or with alkali or acid or both these condensing agents as far as the resins have the property of giving solutions by adding water and alkali, also solutions of coloidal character.

*Example 1.*—60 kilograms of phenolformaldehyde resin are dissolved in 40 kilograms of 95% ethyl alcohol and 100 litres of a solution containing 2.5% of sodium soap are added. The emulsion formed is added to 18 litres of caustic soda solution, agitated, or preferably homogenized for instance by pressing through small openings, and mixed with 100 litres of a solution containing 1% of soda soap agitating the mixture. The process may be carried out at ordinary temperature or at 50–70 degrees centigrade. A fine, almost colorless pulverulent precipitation of purified resin is obtained, which easily deposits and may be easily filtered. After washing and drying the resin is a nearly white pulverulent body, free of by-products.

*Example 2.*—60 kilograms of phenolformaldehyde resin are dissolved in 20 kilograms of alcohol of 95% and 40 litres of a solution containing 2% of soap are added. Then a solution of caustic soda is added until a homogenous solution will be formed. The mixture is then added to 50 litres of a solution containing 1% of soap at 70 degrees centigrade.

The cake of precipitated resin solidifies after some time, which is facilitated by cooling. The cake may be easily ground or triturated to a uniform powder.

*Example 3.*—80 kilograms of phenolformaldehyde resin are dissolved in 20 kilograms of alcohol of 95% and 100 kilograms of a solution containing 2.5% of soap are added. 21 kilograms of caustic soda lye (70 parts by weight of sodium hydroxide) dissolved in 140 parts by weight of water are added, whereby a strongly viscous solution is formed. The mixture is poured into 100 kilograms of a solution containing 1% of soap. The resin is precipitated as white powder.

*Example 4.*—60 kilograms of phenolformaldehyde resin are dissolved in 20 litres of alcohol of 95% and mixed with 100 kilograms of a solution containing 1% of soap. The further proceeding is as in example 3.

*Example 5.*—80 kilograms of phenolformaldehyde resin are dissolved in 20 kilograms of alcohol of 95%, mixed with 100 litres of water and 21 litres of caustic soda lye. The viscous liquid formed is poured in a thin stream at 45–50 degrees centigrade agitating vigorously into 100 litres of water of about 45–50 degrees centigrade. After washing the resin it can be filtered.

The advantage of the process consists in the use of less alkalies and precipitants and its being carried out in less time than the hitherto known processes. The organic solvent can be recovered.

I claim:

1. The process of purifying soluble phenolaldehyde resins which consists in producing a colloidal solution of the said resins with alkalies in a quantity insufficient for transforming the said resins into their alkali metal salts, but sufficient for neutralizing the free phenols and avoiding the hydrolysis of the phenol alkali salts formed and precipitating the resins by means of water.

2. The process of purifying soluble phenolaldehyde resins which consists in producing a solution of the said resins in organic solvents and alkalies in a quantity insufficient for transforming the said resins into their alkali metal salts, but sufficient for neutralizing the free phenols and avoiding the hydrolysis of the phenol alkali salts formed and precipitating the resins by means of water.

3. The process of purifying soluble phenolaldehyde resins which consists in producing a colloidal solution of the said resins with alkalies in a quantity insufficient for transforming the said resins into their alkali metal salts, but sufficient for neutralizing the free phenols and avoiding the hydrolysis of the phenol alkali salts formed and precipitating the resins by means of aqueous solutions of salts which have the property of rendering difficultly soluble or insoluble impurities of the resins soluble in water.

In testimony whereof I hereunto affix my signature.

FRITZ SEEBACH.